May 29, 1923.
J. W. CHADWICK
PORTABLE GAS METER
Filed Dec. 29, 1920
1,456,621
2 Sheets-Sheet 2
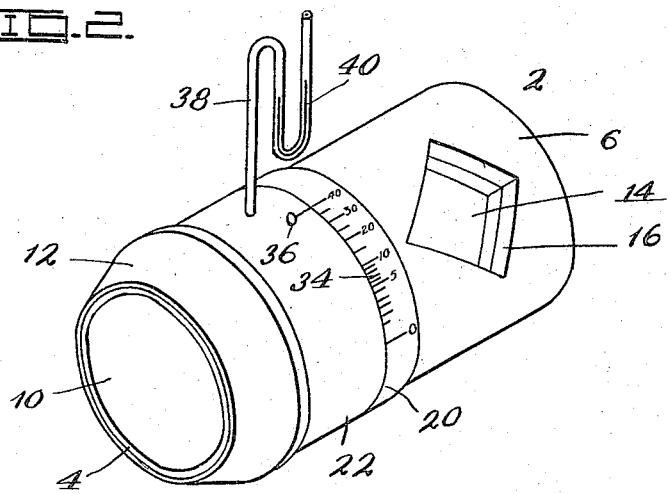
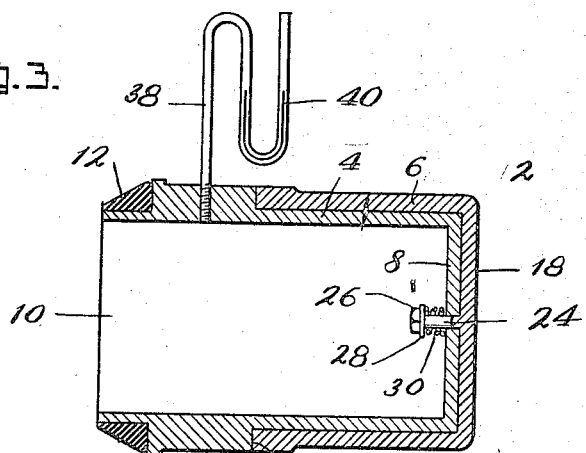
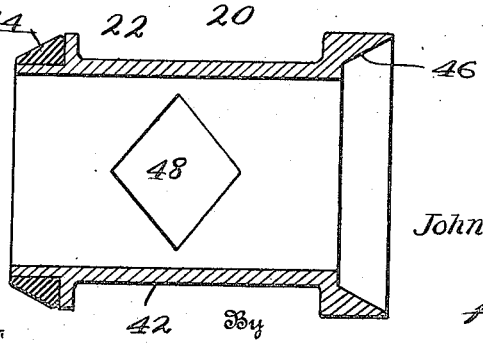
Witness:
Fred C. Riecker
Inventor:
John W. Chadwick,
By F. G. Fischer,
Attorney Patented May 29, 1923.

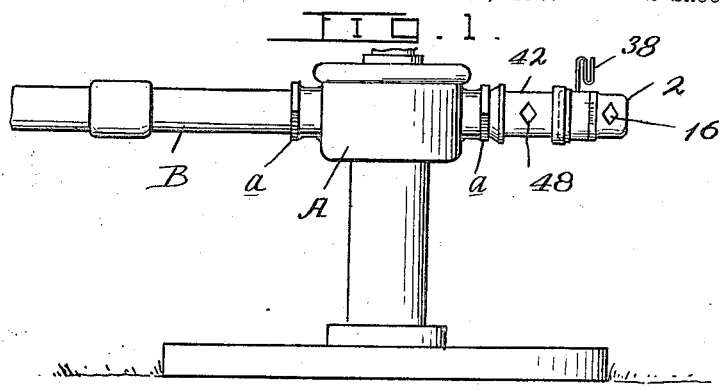
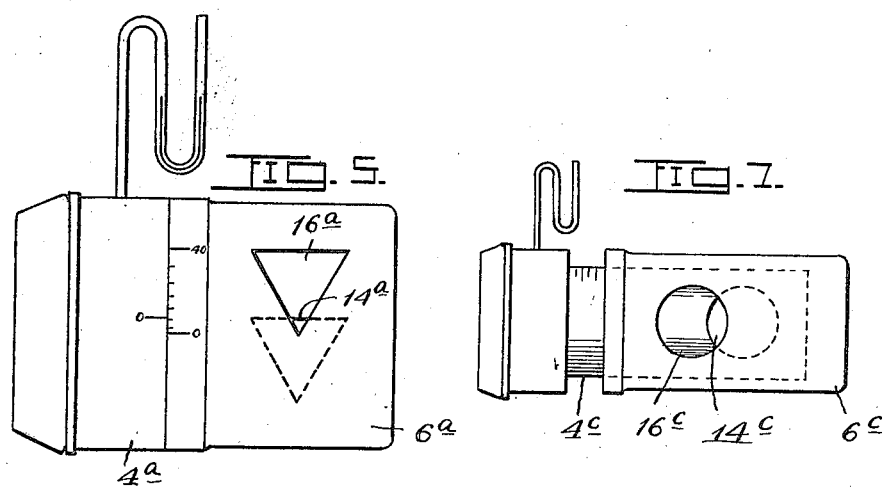
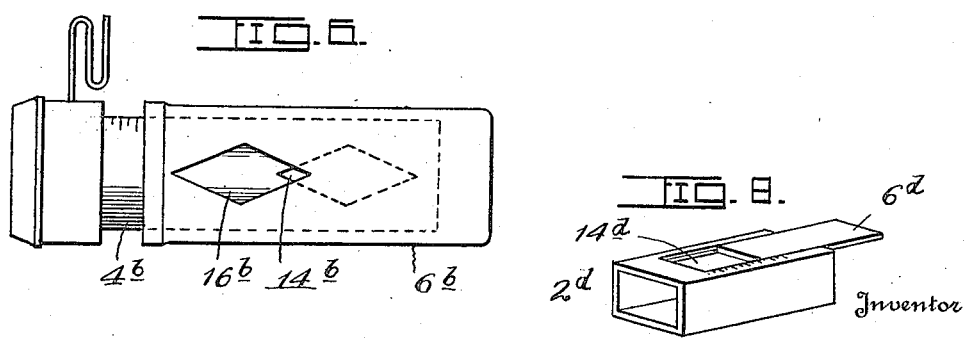

1,456,621

UNITED STATES PATENT OFFICE.

JOHN W. CHADWICK, OF KANSAS CITY, MISSOURI.

PORTABLE GAS METER.

Application filed December 29, 1920. Serial No. 433,905.

*To all whom it may concern:*

Be it known that I, JOHN W. CHADWICK, a citizen of the United States, residing at Kansas City, in the county of Jackson and State of Missouri, have invented certain new and useful Improvements in Portable Gas Meters, of which the following is a specification.

My invention relates to improvements in meters and the prime object of the invention is to provide a small portable device of this character which can be readily carried in the hand and applied to the casing head of an oil well for the purpose of accurately measuring the volume of gas given off by said well.

In the preferred embodiment of the invention a variable discharge orifice and a scale to indicate the degree of opening of said orifice, are employed to read the volume or flow of the gas, and a suitable gage is provided to determine the extent to which the discharge orifice should be opened to maintain the gas under a certain pressure as it flows through the meter.

In order that the invention may be fully understood, reference will now be had to the accompanying drawings, in which:

Fig. 1 is a side elevation of a casing head with the device applied thereto.

Fig. 2 is an enlarged perspective view of the device.

Fig. 3 is a longitudinal sectional view of the device.

Fig. 4 is a detail of an extension employed in carrying out the invention.

Figs. 5, 6, 7 and 8 are modified forms.

A, designates the casing head of an oil well which is provided with nipples $a$, one of which is normally closed by a plug, not shown, while an outlet pipe B for carrying off the gas to any desired point, is connected to the companion nipple.

2 designates the meter which in its preferred embodiment consists of cylindrical tubes 4 and 6, which latter is rotatably mounted upon the former.

The tube 4 is closed at one end, as indicated at 8 and provided at its opposite end with an inlet port 10 which is surrounded by a tapered cushion member 12, for a purpose which will hereinafter appear. The tube 4 is also provided with a peripheral outlet port 14 which coacts with a similar outlet port 16 in the tube 6, in providing a variable discharge orifice which may be completely closed, or opened to any desired degree by rotating the tube 6 upon the tube 4.

The tube 6 fits snugly upon the tube 4 and has a closed end 18 and an open end 20, which latter is held against a peripheral shoulder 22 on the tube 4 by a stud 24 fixed to the closed end 18 and extending axially through the closed end 8 of said tube 4. The inner end of the stud 24 is threaded and provided with a nut 26 and a washer 28 for compressing a coil spring 30, interposed between the end 8 and the washer 28 to coact with the stud 24 in holding the tube 6 upon the tube 4.

The tube 6 is provided with a peripheral scale 34, which is equal in length to either of the ports 14 and 16 and graduated to read the degree of opening of the discharge orifice formed by said ports. The shoulder 22 of the tube 4 has an index mark 36 to coact with the scale 34 in reading the degree of opening of the discharge orifice. While the present scale is calibrated to indicate in thousands of feet per twenty-four hours, any other suitable unit can be used.

38 designates a suitable pressure gage which consists in the present instance of a goose-neck tube fixed at one end to the tube 4, with the interior of which it communicates and having a column 40 of any suitable liquid such as water, mercury, etc.

42 designates an extension tube open at both ends and provided at one end with a tapered annular cushion 44 and having its opposite end tapered inwardly as indicated at 46, into which the cushion 12 of the tube 6 is adapted to snugly fit. The extension tube has a fixed discharge port 48, for a purpose which will hereinafter appear.

In practice when it is desired to ascertain the volume of gas flowing from the well, the plug is removed, so that the open end of the meter 2 may be pressed against the end of the nipple $a$, at the right of the casing head A, as disclosed on Fig. 1, the tapered cushion 12 forming a gas-tight joint. The tube 6 which, preferably, was previously adjusted to close the discharge orifice is then rotated upon the tube 4 to open said discharge orifice until the gage 38 shows a certain pressure of gas passing through the meter 2. If the pressure is great or small the orifice is enlarged or reduced accordingly, the object being to have the gage 38 show a certain pressure irrespective of the volume of gas flowing through the meter 2. As the size of the orifice through which the gas escapes is readily determined by the scale 34 and the index mark 36, and the pressure of the gas flowing through meter 2 is indicated by the gage 38, the volume of gas flowing from the well is readily determined.

Should the volume of gas be such as to exceed the capacity of the meter 2, the extension 42 is interposed between the casing head A and the meter 2, as shown on Fig. 1, so that a portion of the gas may escape through the fixed discharge orifice 48 and thus reduce the volume passing through the meter 2. As the area of the opening 48 is a known quantity the volume of gas passing through such opening is readily ascertained and added to the known volume passing through the ports 14 and 16, to give the correct result.

In the modified form disclosed by Fig. 5, the discharge ports 14$^a$ and 16$^a$ are of triangular form and are opened and closed by rotating the meter member 6$^a$ upon the companion member 4$^a$.

In the modified form disclosed by Fig. 6, the discharge ports 14$^b$ and 16$^b$ are of diamond shape and opened and closed by sliding the member 6$^b$ longitudinally upon the member 4$^b$.

In the modified form disclosed by Fig. 7, the outlet ports 14$^c$ and 16$^c$ are circular and may be opened and closed by either sliding or rotating the member 6$^c$ upon the member 4$^c$.

In the modified form disclosed by Fig. 8, the meter 2$^d$ is rectangular instead of cylindrical as in the preferred form and its outlet port 14$^d$ is opened and closed by a slidable member 6$^d$.

In addition to the forms above described, I also reserve the right to make such other forms as properly fall within the spirit and scope of the appended claims.

Having thus described my invention, what I claim and desire to secure by Letters Patent, is:

1. A portable device of the character described consisting of a tubular member closed at one end and having an outlet port in one side and open at the other end which latter is adapted to be pressed against a fluid-containing pipe, and a second tubular member open at one end and adjustably mounted upon the first member and provided with an outlet port to coact with the first outlet port in providing a variable discharge orifice which may be entirely closed or opened to any desired degree, there being a scale on the second member to coact with an index on the first member to show the degree of such opening.

2. A device of the character described consisting of a tubular member having inlet and outlet ports and a pressure gage, a second tubular member adjustably mounted upon the first member and provided with an outlet port to coact with the first outlet port in providing a variable discharge orifice which may be entirely closed or opened to any desired degree to coact with said gage in determining the volume of a fluid passing through said discharge orifice, there being a scale on one member to coact with an index on the other member to show the degree of such opening, and a tubular extension having inlet and outlet ports and an open end to receive the corresponding end of the first-mentioned tubular member.

In testimony whereof I affix my signature, in the presence of two witnesses.

JOHN W. CHADWICK.

Witnesses:
L. J. FISCHER,
FRED C. FISCHER.